United States Patent [19]
Pripps et al.

[11] Patent Number: 5,775,730
[45] Date of Patent: Jul. 7, 1998

[54] AIRBAG MODULE DIFFUSER

[75] Inventors: Steven R. Pripps, North Ogden, Utah; Claus Geisler, Markgroningen, Germany

[73] Assignee: Morton International, Inc., Chicago, Ill.

[21] Appl. No.: 800,773

[22] Filed: Feb. 14, 1997

[51] Int. Cl.⁶ ............................................. B60R 21/26
[52] U.S. Cl. ............................................. 280/740; 280/732
[58] Field of Search ........................... 280/740, 732, 280/728.2, 736, 737, 741, 742, 728.1

[56] References Cited

U.S. PATENT DOCUMENTS

| | | | |
|---|---|---|---|
| 5,069,480 | 12/1991 | Good | 280/732 |
| 5,308,108 | 5/1994 | Rion | 280/728.2 |
| 5,340,147 | 8/1994 | Fontecchio et al. | 280/740 |
| 5,458,364 | 10/1995 | Mueller et al. | 280/740 |
| 5,470,105 | 11/1995 | Rose et al. | 280/740 |
| 5,634,657 | 6/1997 | Rose et al. | 280/740 |

*Primary Examiner*—Peter C. English
*Attorney, Agent, or Firm*—George W. Rauchfuss, Jr.

[57] ABSTRACT

A diffuser for uniformly diffusing inflation gas from an elongated inflator having inflation exhaust ports at only one end into an airbag cushion. The diffuser having a longitudinal length extending between opposing first and second diffuser ends. A first end section extends from the first diffuser end, is positionable over the inflation exhaust ports of the inflator and defines at least one diffuser vent opening. An intermediate section extends from the first end section and defines a plurality of diffuser vent openings equal or progressively larger further from the first end section. A second end section extends from the intermediate section to the second diffuser end and defines a single diffuser vent opening. Each of the plurality of diffuser vent openings of the intermediate section is equal or larger than the at least one diffuser vent opening of the first end section and equal or smaller than the single diffuser vent opening of the second end section. All of the diffuser vent openings form a total diffuser vent area of the diffuser. The first end section has a diffuser vent area equal to between about four and about ten percent of the total diffuser vent area, while the intermediate section has a diffuser vent area equal to between about thirty and about fifty-six percent of the total diffuser vent area, and the second end section has a diffuser vent area equal to between about forty and about sixty percent of the total diffuser vent area.

10 Claims, 2 Drawing Sheets

AIRBAG MODULE DIFFUSER

FIELD OF THE INVENTION

The present invention relates to an airbag module and, more particularly, to a diffuser for use with an airbag module.

BACKGROUND OF THE INVENTION

An airbag module is employed in a vehicle, particularly an automobile, for protecting an occupant against injury by deploying an inflated airbag cushion to physically restrain the occupant's body when the vehicle encounters a collision. A passenger side airbag module is normally positioned in a dashboard of a vehicle, in front of the front passenger seat. Some passenger side airbag modules include a trough-shaped module housing (or reaction canister) containing an airbag cushion, an inflator for inflating the airbag cushion upon receiving a signal from a remote collision sensor, and a diffuser separating the airbag cushion from the inflator. The diffuser defines diffuser vent openings for diffusing inflation gas from the inflator into the airbag cushion. The diffuser can be unitarily formed with the reaction canister.

The inflators in passenger side airbag modules are usually elongated and, depending on the type of inflator, define inflation exhaust ports at only one end thereof. Inflation gas exiting the inflator from only one end thereof, however, can cause uneven or skewed inflation of the airbag cushion. Skewed inflation is unwanted because it can cause the top of the airbag cushion to strike the occupant before being fully inflated. Skewed inflation can also cause the airbag cushion to push the occupant to the side of the inflating airbag cushion so that the occupant does not receive the protection of the inflated airbag cushion. Skewed inflation additionally places severe stress on the airbag cushion.

In contrast, equal or even inflation of the airbag cushion allows the airbag cushion to be fully inflated and correctly positioned before an occupant is carried, by the force of deceleration caused by a collision of the vehicle, into the fully inflated and correctly positioned airbag cushion.

It would be useful, therefore, to provide a diffuser that substantially uniformly diffuses inflation gas, exiting inflation exhaust ports defined by one end of an elongated inflator, into an airbag cushion to encourage even inflation of the airbag cushion.

SUMMARY OF THE INVENTION

A general object, therefore, of the present invention is to provide a new and improved passenger side airbag module.

A more specific object of the present invention is to provide a new and improved diffuser for use with a passenger side airbag module.

Another object of the present invention is to provide a diffuser that substantially uniformly diffuses inflation gas, exiting inflation exhaust ports defined by one end of an elongated inflator, into an airbag cushion to encourage even inflation of the airbag cushion.

In meeting one or more of the above objects, the present invention provides a diffuser for substantially uniformly diffusing inflation gases from an elongated fluid fuel inflator having inflation exhaust ports at only one end thereof into the mouth of an inflatable airbag cushion. The diffuser includes opposing first and second diffuser ends. A first end section extends from the first diffuser end, is positionable over the inflation exhaust ports of the elongated inflator and defines at least one diffuser vent opening. An intermediate section extends from the first end section and defines a plurality of diffuser vent openings, with each of the plurality of diffuser vent openings being equal or larger than a preceding diffuser vent opening closer to the first end section. A diffuser vent opening of the plurality of diffuser vent openings of the intermediate section closest to the first end section is equal or larger than the at least one diffuser vent opening of the first end section. A second end section extends from the intermediate section to the second diffuser end and defines a single diffuser vent opening equal to or larger than a diffuser vent opening of the plurality of diffuser vent openings of the intermediate section closest to the second end section.

The at least one diffuser vent opening of the first end section, the plurality of diffuser vent openings of the intermediate section, and the single diffuser vent opening of the second end section form a total diffuser vent area of the diffuser. The at least one diffuser vent opening of the first end section has a diffuser vent area equal to between about four and about ten percent of the total diffuser vent area. The plurality of diffuser vent openings of the intermediate section combined have a diffuser vent area equal to between about thirty and about fifty-six percent of the total diffuser vent area. The single diffuser vent opening of the second end section has a diffuser vent area equal to between about forty and about sixty percent of the total diffuser vent area.

According to one preferred aspect of the present invention, a ratio of the diffuser vent area of the single diffuser vent opening of the second end section to the diffuser vent area of the at least one diffuser vent opening of the first end section is equal to at least eleven.

According to an additional aspect of the present invention, the second end section is longer than both the first end section and the intermediate section.

According to one embodiment of the present invention, the diffuser vent area of the at least one diffuser vent opening of the first end section equals about five percent of the total diffuser vent area, the diffuser vent area of the plurality of diffuser vent openings of the intermediate section equals about forty percent of the total diffuser vent area, and the diffuser vent area of the single diffuser vent opening of the second end section equals about fifty-five percent of the total diffuser vent area.

The present invention also provides an airbag module including the diffuser defined above. The airbag module further includes an elongated, generally trough-shaped module housing, a folded, inflatable airbag cushion and an elongated inflator for providing inflation gas for inflating the airbag cushion.

The module housing has a bottom wall, and a pair of opposing endwalls and a pair of sidewalls extending upwardly from the bottom wall and forming an open top. The airbag cushion has an open mouth for receiving inflation gas from the inflator, and the airbag cushion is mounted within the module housing adjacent the open top of the module housing. The elongated inflator extends between the opposing endwalls of the module housing adjacent the bottom wall and defines a plurality of inflation exhaust ports at a first end thereof.

The diffuser is positioned within the module housing above the inflator and below the open mouth of the folded, inflatable airbag cushion. The diffuser extends between the opposing sidewalls of the module housing and the first and second diffuser ends extend between the opposing endwalls of the module housing so that the diffuser encloses the inflator within the module housing. The diffuser substantially uniformly diffuses inflation gas from the inflation exhaust ports defined by the first end of the elongated inflator into the mouth of the inflatable airbag cushion.

According to one aspect of the present invention, the inflator of the airbag module is a fluid fuel inflator of the type disclosed in U.S. Pat. No. 5,470,104.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
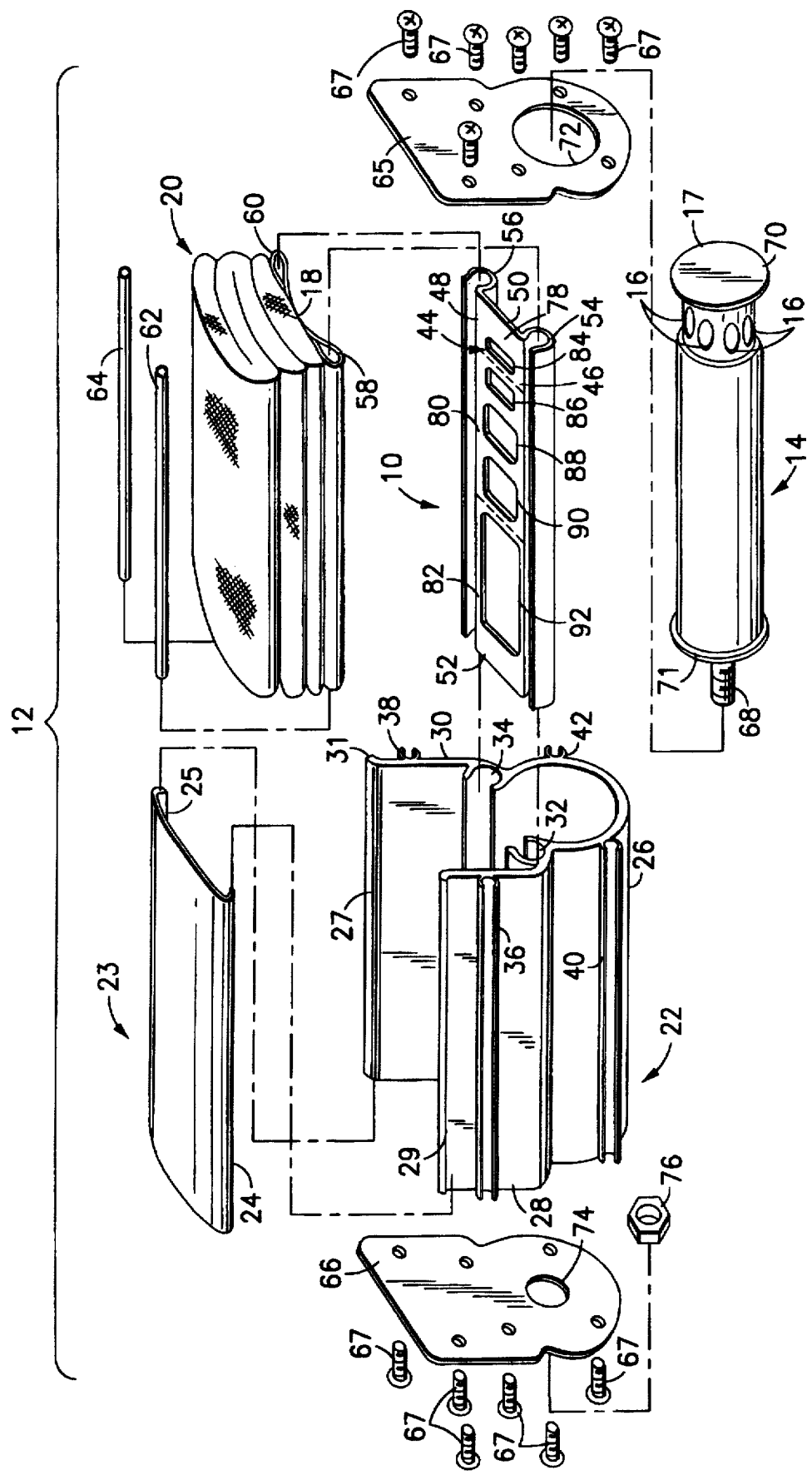
FIG. 1 is an exploded perspective side view of an airbag module including a diffuser having diffuser vent openings according to the present invention.

Referring first to FIG. 1, the present invention provides a diffuser 10 for use as part of a passenger-side airbag module 12. The diffuser 10 uniformly diffuses inflation gas from an elongated fluid fuel inflator 14 having inflation exhaust ports 16 at only a first end 17 thereof into a mouth 18 of an inflatable airbag cushion 20, thereby encouraging even inflation of the airbag cushion.

In addition to the diffuser 10, the inflator 14 and the airbag cushion 20, the airbag module 12 includes a module housing 22 and a cushion cover 23. The module housing 22 (also referred to in the art as a reaction canister) is generally trough-shaped and has a semi-tubular bottom wall 26, a first sidewall 28 and an opposing second sidewall 30 forming a pair of open ends and an open top 27. Two opposed, parallel mounting channels 32,34 are unitary, respectively, with the first and the second sidewalls 28,30. Two opposed, parallel fastener channels 36,38 are unitary with the first and the second sidewalls 28,30, and two opposed, parallel fastener channels 40,42 are unitary with the bottom wall. The module housing 22 can made from a suitable lightweight and rigid material such as a metal or an engineering plastic with or without reinforcement fillers, for example. It is sometimes preferable for the housing to be made of welded sheet steel. According to one aspect of the present invention, the module housing 22 is made from aluminum and is formed by being extruded, or the module housing is made of a suitable plastic and injection molded.

The diffuser 10 includes a flat, rectangular diffuser shelf 44 having a pair of opposite diffuser side edges 46,48 and a pair of opposite first and second diffuser ends 50,52. The diffuser 10 also includes a pair of diffuser side tubes 54,56 extending from the diffuser side edges 46,48 of the diffuser shelf 44.

The diffuser 10 is mounted within the module housing 22 with the diffuser side tubes 54,56 received within the parallel mounting channels 32,34 formed in the first and the second sidewalls 28,30 of the module housing. The inflatable airbag cushion 20 is folded and the mouth 18 of the airbag cushion is rectangular and partially formed by opposing cushion tubes 58,60. The airbag cushion 20 is mounted within the module housing 22 above the diffuser 10 and adjacent the open top 27 of the module housing, with cushion rods 62,64 securing the cushion tubes 58,60 of the airbag cushion within the diffuser side tubes 54,56, as is known in the art. First and second endplates 65,66 close the open ends of the module housing 22 (thereby acting as endwalls of the module housing) with the diffuser shelf 44 extending between the endplates. The airbag module 12 is secured together by a plurality of screws 67 which extend through the first and the second endplates 65,66 into the fastener channels 36,38,40,42 formed in the module housing 22 and also the ends of the cushion rods 62,64, which can be threaded. The cushion cover 23 includes opposing curled-under side edges 24,25 which catch on outwardly curled top edges 29,31 of the first and second sidewalls 28,30, securing the cushion cover to the module housing 22 and closing the open top 27 of the module housing. The cushion cover 23 protects the folded airbag cushion 20 and is rupturable upon inflation of the airbag cushion.

The airbag inflator 14 provides inflation gas for inflating the airbag cushion 20 and is a fluid fuel type of inflator generally containing liquid propellant and an initiator, as is known in the art. The inflator 14 is elongated and defines the inflation exhaust ports 16 at only the first end 17 thereof. The inflator 14 also includes a mounting stud 68 extending from a second end 71 of the inflator and a mounting flange 70 at the first end 17 of the inflator. The inflator 14 extends through an inflator-receiving opening 72 in the first endplate 65 and is received within the module housing 22 adjacent the bottom wall 26, between the endplates 65,66 and below the diffuser 10, with the diffuser shelf 44 cooperating with the reaction canister and the endplates to enclose or surround the inflator. The mounting flange 70 of the inflator 14 catches the first endplate 65 around the inflator-receiving opening 72 and the mounting stud 68 extends through a stud hole 74 in the second endplate 66 and is fastened with a nut 76 to secure the inflator within the module housing 22.

Figure 2:
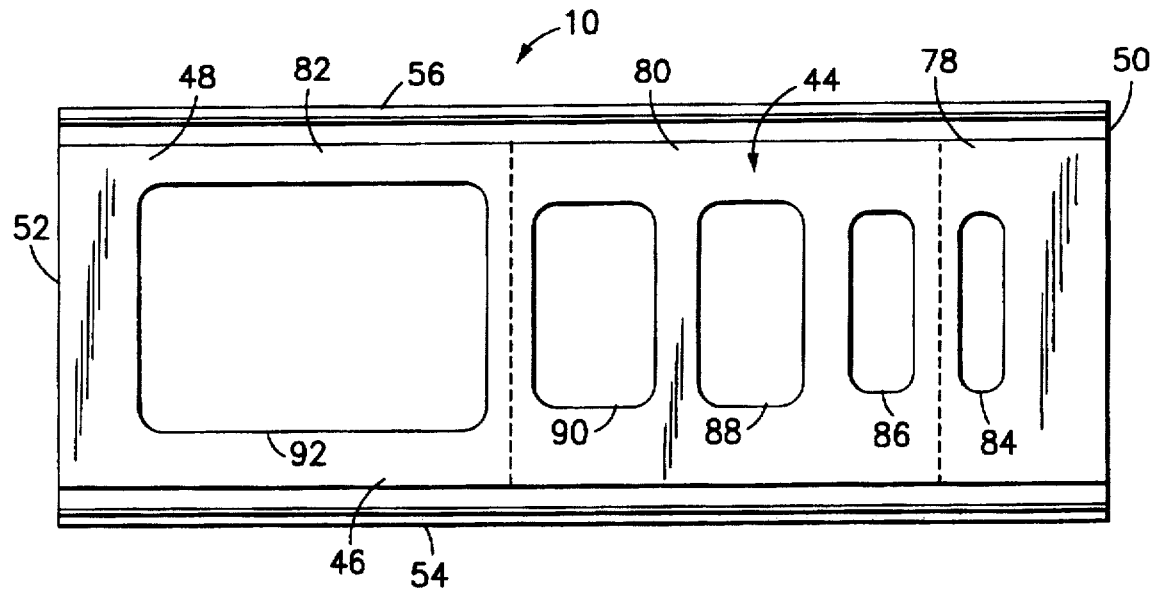
FIG. 2 is a top plan view of the diffuser of FIG. 1.

Referring also to FIG. 2, the diffuser 10 of the present invention is shown independent of the airbag module 12. As mentioned above, the diffuser 10 substantially uniformly diffuses inflation gas from the elongated inflator 14 having the inflation exhaust ports 16 at only one end 17 thereof into the mouth 18 of the inflatable airbag cushion 20, thereby encouraging even inflation of the airbag cushion. The diffuser shelf 44 includes a first end section 78 extending from the first diffuser end 50 to an intermediate section 80, which extends to a second end section 82 opposite the first end section and extending to the second diffuser end 52. Although the first end section 78, the intermediate section 80 and the second end section 82 are unitary, for purposes of illustration they are shown divided by broken lines. The diffuser shelf 44 has a longitudinal (or straight line) length extending between the first diffuser end 50 and the second diffuser end 52 and through the first end section 78, the intermediate section 80 and the second end section 82, and has a width extending between the opposite diffuser side edges 46,48. As shown, the second end section 82 is longer than both the first end section 78 and the intermediate section 80.

The first end section 78 of the diffuser 10 is positioned over the inflation exhaust ports 16 of the elongated inflator 14 and defines a first diffuser vent opening 84. The first diffuser vent opening 84 is spaced from the first diffuser end 50 by about 0.89 inches (22.6 mm) and has a length (with reference to the longitudinal length of the diffuser extending between the first and second diffuser ends 50,52) of about 0.39 inch (10.0 mm) and a width (with reference to the width of the diffuser extending between the opposite diffuser side edges 46,48) of about 1.65 inches (42.0 mm).

The first end section 78 can define more than one diffuser vent opening, but must define at least one diffuser vent opening. In addition, if the first end section 78 defines more than one diffuser vent opening each of the diffuser vent openings must be equal or larger than a preceding diffuser vent opening closer to the first diffuser end 50.

The intermediate section 80 of the diffuser 10 defines second, third and fourth diffuser vent openings 86,88,90. The second diffuser vent opening 86 is spaced from the first diffuser end 50 by about 1.7 inches (42.6 mm) and has a length of about 0.55 inch (14.0 mm) and a width of about 1.65 inches (42.0 mm). The third diffuser vent opening 88 is spaced from the first diffuser end 50 by about 2.6 inches (66.6 mm) and has a length of about 1.02 inches (26.0 mm) and a width of about 1.8 inches (45.0 mm). The fourth diffuser vent opening 90 is spaced from the first diffuser end 50 by about 4.0 inches (100.6 mm) and has a length of about 1.14 inches (29.0 mm) and a width of about 1.8 inches (45.0 mm).

The intermediate section 80 can define more or less than three diffuser vent openings but must define a plurality of diffuser vent openings. In addition, each of the diffuser vent openings defined by the intermediate section 80 must be equal or larger than a preceding diffuser vent opening closer to the first end section 78. Also, the diffuser vent opening 86 of the intermediate section 80 nearest the first end section 78 (the first or smallest diffuser vent opening of the intermediate section) must be equal to or larger than the largest diffuser vent opening 84 of the first end section.

The second end section 82 of the diffuser 10 defines a fifth diffuser vent opening 92. The fifth diffuser vent opening 92 is spaced from the first diffuser end 50 by about 5.5 inches (139.6 mm) and has a length of about 3.07 inches (78.0 mm) and a width of about 2.2 inches (55.0 mm). The second end section 82 must define only one diffuser vent opening. Also, the diffuser vent opening 92 of the second end section 82 must be equal to or larger than the diffuser vent opening 90 of the intermediate section 80 nearest the second end section (the last or largest diffuser vent opening of the intermediate section).

All of the diffuser vent openings 84,86,88,90,92, form a total diffuser vent area of the diffuser 10 equal to about 12.0 square inches (7773 square mm). The first diffuser vent opening 84 of the first end section 78 has a diffuser vent area equal to about 5% or 0.65 square inch (420 square mm). The second, third and fourth diffuser vent openings 86,88,90 of the intermediate section 80 combined have a diffuser vent area equal to about 40% or 4.75 square inches (3063 square mm). The fifth diffuser vent opening 92 of the second end section 82 has a diffuser vent area equal to about 55% or 6.65 square inches (4290 square mm).

The first end section 78 can form a diffuser vent area equal to more or less than about five percent (5%) but must equal between about four and about ten percent (4–10%) of the total diffuser vent area of the diffuser 10. The intermediate section 80 can form a diffuser vent area more or less than about forty percent (40%) but must equal between about thirty and about fifty-six percent (30–56%) of the total diffuser vent area. The second end section 82 can form a diffuser vent area less than fifty-five percent (55%) but must equal between about forty and about sixty percent (40–60%) of the total diffuser vent area. In addition, a ratio of the diffuser vent area of the second end section 82 to the diffuser vent area of the first end section 78 is equal to at least about eleven (11).

Figure 3:
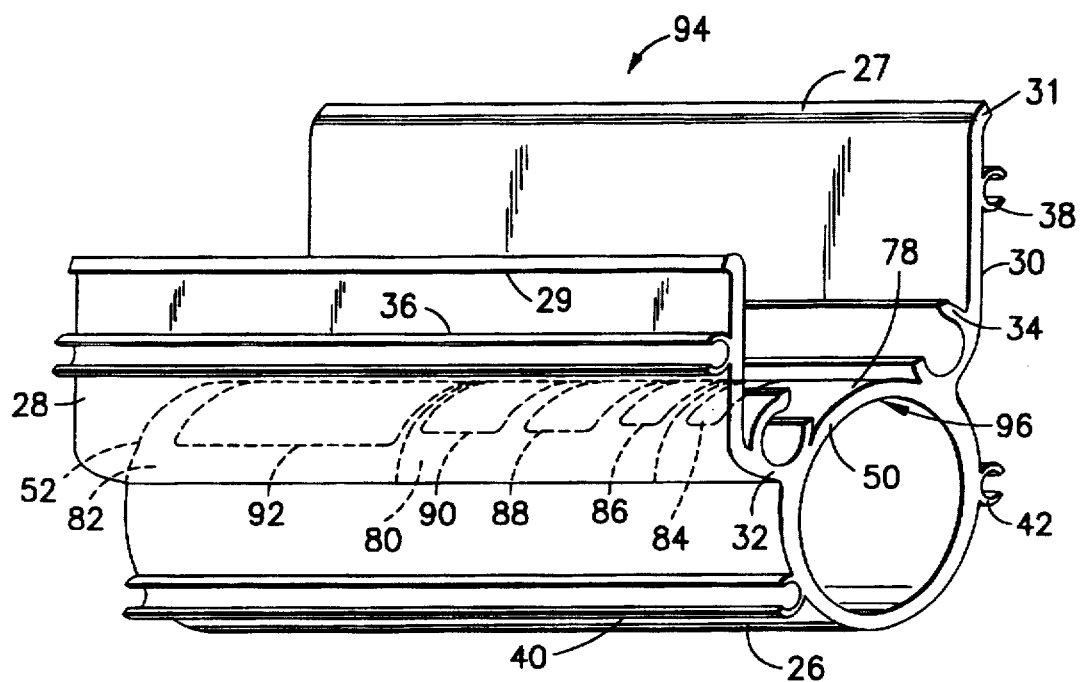
FIG. 3 is a perspective side view of a reaction canister including a unitary diffuser according to the present invention having the diffuser vent openings of FIGS. 1 and 2.

Referring to FIG. 3, a module housing 94 having a unitary diffuser 96 according to the present invention is shown. The module housing 94 is similar to the module housing 22 of FIG. 1 and elements which are the same have the same reference numeral. The unitary diffuser 96 is also similar to the diffuser 10 of FIGS. 1 and 2 and elements which are the same have the same reference numeral. The module housing 94 can be made from a suitable lightweight and rigid material such as a metal or an engineering plastic with or without reinforcement fillers, for example. Preferably the module housing 94 along with the unitary diffuser 96 is made from aluminum and is formed by being extruded and the diffuser vent openings 84,86,88,90,92 are then punched out of the diffuser. Alternatively, the module housing 94 and unitary diffuser 96 can be made of a suitable plastic and injection molded.

The present invention, therefore, provides a novel, simple and effective means for encouraging even inflation of the airbag cushion. Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. A diffuser for substantially uniformly diffusing inflation gases into a mouth of an inflatable airbag cushion from an elongated inflator having inflation exhaust ports at only one end thereof, the diffuser comprising:

opposing first and second diffuser ends;

a first end section extending from the first diffuser end, positionable over the inflation exhaust ports of the elongated inflator and defining at least one diffuser vent opening;

an intermediate section extending from the first end section and defining a plurality of diffuser vent openings, each of the plurality of diffuser vent openings being equal or larger than a preceding diffuser vent opening closer to the first end section, with a diffuser vent opening of the plurality of diffuser vent openings of the intermediate section closest to the first end section being equal or larger than the at least one diffuser vent opening of the first end section;

a second end section extending from the intermediate section to the second diffuser end and defining a single diffuser vent opening equal to or larger than a diffuser vent opening of the plurality of diffuser vent openings of the intermediate section closest to the second end section;

the at least one diffuser vent opening of the first end section, the plurality of diffuser vent openings of the intermediate section, and the single diffuser vent opening of the second end section forming a total diffuser vent area of the diffuser;

the at least one diffuser vent opening of the first end section having a diffuser vent area equal to between about four and about ten percent of the total diffuser vent area;

the plurality of diffuser vent openings of the intermediate section combined having a diffuser vent area equal to between about thirty and about fifty-six percent of the total diffuser vent area; and the single diffuser vent opening of the second end section having a diffuser vent area equal to between about forty and about sixty percent of the total diffuser vent area.

2. A diffuser according to claim 1 wherein a ratio of the diffuser vent area of the single diffuser vent opening of the second end section and the diffuser vent area of the at least one diffuser vent opening of the first end section is equal to at least eleven.

3. A diffuser according to claim 2 wherein:
the diffuser vent area of the at least one diffuser vent opening of the first end section equals about five percent of the total diffuser vent area;
the diffuser vent area of the plurality of diffuser vent openings of the intermediate section equals about forty percent of the total diffuser vent area; and
the diffuser vent area of the single diffuser vent opening of the second end section equals about fifty-five percent of the total diffuser vent area.

4. A diffuser according to claim 1 wherein the second end section is longer than the first end section and longer than the intermediate section.

5. A diffuser for diffusing inflation gas into an inflatable airbag cushion from an elongated inflator having inflation exhaust ports at only one end thereof, the diffuser comprising:
a longitudinal length from a first end section through an intermediate section to a second end section;
the first end section positionable over the inflation exhaust ports of the elongated inflator and defining at least one diffuser vent opening;
the intermediate section defining a plurality of diffuser vent openings, each of the plurality of diffuser vent openings being equal or larger than a preceding diffuser vent opening closer to the first end section, with a diffuser vent opening of the plurality of diffuser vent openings of the intermediate section closest to the first end section being equal or larger than the at least one diffuser vent opening of the first end section;
the second end section defining a single diffuser vent opening equal to or larger than a diffuser vent opening of the plurality of diffuser vent openings of the intermediate section closest to the second end section;
the at least one diffuser vent opening of the first end section, the plurality of diffuser vent openings of the intermediate section, and the single diffuser vent opening of the second end section forming a total diffuser vent area of the diffuser;
the at least one diffuser vent opening of the first end section having a diffuser vent area equal to between about four and about ten percent of the total diffuser vent area;
the plurality of diffuser vent openings of the intermediate section combined having a diffuser vent area equal to between about thirty and about fifty-six percent of the total diffuser vent area; and
the single diffuser vent opening of the second end section having a diffuser vent area equal to between about forty and about sixty percent of the total diffuser vent area.

6. A diffuser according to claim 5 wherein a ratio of the diffuser vent area of the single diffuser vent opening of the second end section and the diffuser vent area of the at least one diffuser vent opening of the first end section is equal to at least eleven.

7. A diffuser according to claim 5 wherein the second end section is longer than the first end section and longer than the intermediate section.

8. An airbag module comprising:
A) an elongated, generally trough-shaped module housing having a bottom wall, and a pair of opposing endwalls and a pair of opposing sidewalls extending upwardly from the bottom wall and forming an open top;
B) a folded, inflatable airbag cushion having an open mouth for receiving inflation gas, the airbag cushion mounted within the module housing adjacent the open top of the module housing;
C) an elongated fluid fuel inflator for providing inflation gas for inflating the airbag cushion, the elongated inflator extending between the opposing endwalls of the module housing adjacent the bottom wall and defining a plurality of inflation exhaust ports at a first end thereof;
D) a diffuser extending between the opposing sidewalls of the module housing above the inflator and below the open mouth of the folded, inflatable airbag cushion, the diffuser including,
1) opposing first and second diffuser ends extending between the opposing endwalls of the module housing so that the diffuser encloses the inflator within the module housing;
2) a first end section extending from the first diffuser end and positioned over the inflation exhaust ports of the elongated inflator, the first end section defining at least one diffuser vent opening;
3) an intermediate section extending from the first end section and defining a plurality of diffuser vent openings, each of the plurality of diffuser vent openings being equal or larger than a preceding diffuser vent opening closer to the first end section, with a diffuser vent opening of the plurality of diffuser vent openings of the intermediate section closest to the first end section being equal or larger than the at least one diffuser vent opening of the first end section;
4) a second end section extending from the intermediate section to the second diffuser end and defining a single diffuser vent opening equal to or larger than a diffuser vent opening of the plurality of diffuser vent openings of the intermediate section closest to the second end section;
5) the at least one diffuser vent opening of the first end section, the plurality of diffuser vent openings of the intermediate section, and the single diffuser vent opening of the second end section forming a total diffuser vent area of the diffuser;
6) the at least one diffuser vent opening of the first end section having a diffuser vent area equal to between about four and about ten percent of the total diffuser vent area;
7) the plurality of diffuser vent openings of the intermediate section combined having a diffuser vent area equal to between about thirty and about fifty-six percent of the total diffuser vent area; and
8) the single diffuser vent opening of the second end section having a diffuser vent area equal to between about forty and about sixty percent of the total diffuser vent area.

9. An airbag module according to claim 8 wherein a ratio of the diffuser vent area of the single diffuser vent opening of the second end section and the diffuser vent area of the at least one diffuser vent opening of the first end section is equal to at least eleven.

10. An airbag module according to claim 9 wherein the second end section of the diffuser is longer than the first end section and longer than the intermediate section.

* * * * *